United States Patent Office 3,577,242
Patented May 4, 1971

3,577,242
ANTEMORTEM METHOD OF TENDERIZING MEAT
Edwin P. Jenevein, Jr., 7036 Town N.,
Dallas, Tex. 75231
No Drawing. Filed June 6, 1966, Ser. No. 555,289
Int. Cl. A22c 18/00
U.S. Cl. 99—107                       6 Claims

ABSTRACT OF THE DISCLOSURE

An antemortem method of tenderizing meat by administering to an animal before slaughter a collagen diminution agent (an agent which will destroy and/or inhibit collagen formation, but will not materially attack muscle cells in the subject animal), and allowing the collagen diminution agent to assimilate within the animal before it is slaughtered.

---

The present invention relates to a method of tenderizing meat. More specifically, it relates to a method which involves treatment of meat-producing livestock prior to the time that such livestock is slaughtered.

In the past, meat has been tenderized by a variety of methods. Most of these involve the postmortem treatment of the carcass or of dressed meat obtained therefrom. In a few instances, antemortem treatment has been used. Typical of the antemortem treatment is injection of proteolytic enzymes into a living animal a short time prior to its slaughter. In general, the prior art methods have proved to be relatively expensive and have produced only limited success.

While the prior art antemortem treatment, referred to above, has achieved some degree of success, it possesses a major disadvantage in that muscle cells of the animal treated are destroyed in the course of treatment. Consequently, the quality of the meat product obtained from the animal is damaged by the treatment.

An object of the present invention is to provide a simple, relatively inexpensive, and yet efficient antemortem method of tenderizing meat to produce a quality product.

A further object is to provide such a method of tenderizing meat which yields a meat product that is tender in inner regions as well as in surface regions.

Yet another object is to provide such a method which obviates the necessity of feeding livestock large quantities of expensive feed in order to obtain a tender meat product therefrom.

Still another object is to provide such a method which tenderizes meat without promoting shrinkage or discoloration or otherwise disturbing the appearance, quality or taste of the ultimate product.

An additional object is to provide such a method which specifically destroys and/or inhibits the formation of collagen fiber without damaging muscle cells.

The method of the present invention comprises administering a collagen diminution agent to a living animal which is of the type that is suitable to provide meat as food for carnivorous mammals. The animal is slaughtered after a suitable predetermined period passes and the resulting carcass dressed to provide tender meat.

The collagen diminution agent may be of two general types, either a lathyrogen or a cysteine antagonist. The lathyrogen type of collagen diminution agent functions primarily by breaking down collagen, while the cysteine antagonist type of collagen diminution agent basically functions by inhibiting the formation of collagen. In view of the fact that collagen is the fiber which accounts for the cohesiveness of tissue, and hence the toughness of meat, in both instances the resulting diminution of total collagen in the animal to be slaughtered tenderizes the meat of the animal.

Lathyrogens and cysteine antagonists are characteristically both small molecules, as contrasted, for example, to enzymes, which are large protein molecules. When the small molecules of lathyrogen and/or cysteine antagonists are administered to a living animal prior to slaughter, they distribute throughout the body of the living animal and destroy and/or inhibit collagen formation, yet do not materially attack muscle cells in the subject animal. Consequently, the animal may be slaughtered after having been treated with the collagen diminution agent and the carcass dressed to obtain tender meat in which the muscle cells have not been damaged by the tenderizing process. The resulting tender meat may be used as food for carnivorous mammals, for example, for dogs, cats and other pets, as well as for man.

Many substances have lathyrogenic properties, the following being exemplary only:

beta-amino propionitrile
amino acetonitrile hydrogen sulfate
amino antipyrine hydrogen chloride
1-benzyl 1-phenylhydrazine hydrogen chloride
semicarbazide hydrogen chloride
4-phenyl 3-thiosemicarbazide
thiosemicarbazide
1-methyl 1-phenylhydrazine
phenylhydrazine Many substances are cysteine antagonists, the most desirable of which at the present time appears to be penicillamine.

In the practice of the present invention, it is only necessary that the collagen diminution agent be administered prior to the slaughter of the subject animal a sufficient period of time to permit the assimilation of the agent by the animal's body. The dosage and the schedule of administration can be varied, depending upon the degree of result desired and further depending on the particular type and size of subject animal. Small doses in the range of hundreths of grams per kilogram of body weight of the animal may be given over a period of weeks. On the other hand, larger doses may be given on only a few occasions, in some instances only once.

If desired, the effectiveness of a given collagen diminution agent can be monitored during the course of its administration. For example, the effectiveness of a lathyrogen can be monitored by measuring the quantity of urinary amino acids in the animal subject. Collagen is composed of a number of amino acids and two of these, proline and hydroxyproline, are found in large quantities only in it. Consequently, the amount of proline and hydroxypyroline, found in the urine of a subject animal is proportional to the amount of collagen which has been catabolized by administration of the lathyrogen. Through measurement of these materials in the urine, it is therefore possible to choose the dosage and variety of lathyrogen which is most suitable for a given species and herd.

The following specific examples are offered as illustrative of the present invention and are not intended to be construed as limiting its scope.

EXAMPLE 1

Five hundred grams of beta-amino propionitrile are administered to a range fed "utility" grade steer over a period of seven days, with the beta,-amino propionitrile being intramuscularly injected by hypodermic syringe in seven equal daily doses. The animal weighed 400 lbs.

One day after the last of the seven doses by which the total of five hundred grams of lathyrogen is administered, the animal is slaughtered. The meat obtained from the carcass on dressing is compared to the meat obtained from a control animal of comparable size. The control animal is also a range fed steer of "utility" grade. The meat obtained from the carcass of the animal administered the lathyrogen is found to be much more tender than the meat from the carcass of the control animal.

The meat from the carcass of the animal administered the lathyrogen is utilized as food for a man. The quality and texture of the meat is quite good, and its flavor is also noted to be quite good.

The meat obtained from the carcass of the animal administered the lathyrogen is also satisfactorily used as dog food.

In the foregoing example, the administration of the material was accomplished by intramuscular injection. If desired, the injection may be intravenous or subcutaneous instead of intramuscular, or indeed by any parenteral method. Moreover, the administration may be effectively accomplished orally. The lathyrogen is effectively administered in the latter case by mixing it with water or feed.

Another lathyrogen, e.g., any one of the list previously set forth herein, can be used in place of the beta-amino propionitrile of the foregoing example to achieve substantially the same results.

The following example relates to the use of cysteine antagonists in the practice of the present invention.

EXAMPLE 2

The method of Example 1 is repeated except that the collagen diminution agent utilized is penicillamine and the dosage is five grams per day for seven days. The results obtained in this example are similar to those obtained in Example 1.

The present example may be performed by oral administration of the cysteine antagonist instead of by injection, if desired.

In some instances, it is preferable to combine a lathyrogen and a cysteine antagonist in the antemortem treatment of an animal. Through such combination, collagen breakdown and the inhibition of collagen formation are simultaneously obtained.

In the practice of the present invention, it has been seen that the collagen diminution agent may be injected parenterally or administered orally, as by mixing the material in livestock feed and/or water.

Essentially any substance having material lathyrogenic properties or cysteine antagonistic properties may be utilized to tenderize meat, however, consideration should be given to the degree of toxicity which might be anticipated from the agent and to the rate to which such agent is dissipated from the body of the living animal to which it is administered. In general, it is desirable to keep dosage low and to provide a reasonably large lapse of time between the last administration of the agent and the slaughtering of the animal.

It should be understood that whether a multiplicity of small doses be regularly administered over a long period of time or but a single dose or a few doses used instead, will depend on the practicality of the situation involved, on the particular agent employed, and on the specific animal type and weight to which it is administered.

Having described the invention in connection with certain specific embodiments thereof, it is to be understood that further modifications may now suggest themselves to those skilled in the art and it is intended to cover such modifications as fall within the scope of the appended claims.

What is claimed is:
1. A method of tenderizing meat comprising:
   (a) administering to a living animal which is of the type suitable to provide meat as food for carnivorous mammals a collagen diminution agent selected from the group consisting of lathyrogens and cysteine antagonists in an effective amount to diminish collagen formation within the body of said living animal; and
   (b) allowing assimilation of said collagen diminution agent within the body of said living animal before it is slaughtered.
2. The method of claim 1 in which the collagen diminution agent is a lathyrogen.
3. The method of claim 2 in which the said lathyrogen is selected from the group consisting of:

beta-amino propionitrile
amino acetonitrile hydrogen sulfate
amino antipyrine hydrogen chloride
1-benzyl 1-phenylhydrazine hydrogen chloride
semicarbazide hydrogen chloride
4-phenyl 3-thiosemicarbazide
thiosemicarbazide
1-methyl 1-phenylhydrazine
phenylhydrazine.

4. The method of claim 1 in which said collagen diminution agent is a cysteine antagonist.
5. The method of claim 4 in which said cysteine antagonist is penicillamine.
6. The method of claim 1 in which said collagen diminution agent is a material including both a lathyrogen and a cysteine antagonist.

References Cited

UNITED STATES PATENTS

| | | | |
|---|---|---|---|
| 2,903,362 | 9/1959 | Beuk et al. | 99—107 |
| 3,052,551 | 9/1962 | Hogan | 99—107 |
| 3,123,477 | 3/1964 | Reece | 99—107 |
| 3,163,540 | 12/1964 | Hogan et al. | 99—107 |

OTHER REFERENCES

American Meat Institute Foundation, "The Science of Meat and Meat Products," 1960, published by W. H. Freeman and Company, San Francisco, pp. 43 and 78.

"Nature," July 25, 1964, vol. 203, pp. 378, 379, and 380, article entitled Relevance of Biochemical Taxonomy to the Problem of Lathyrism.

HYMAN LORD, Primary Examiner